United States Patent
Gerfers et al.

(10) Patent No.: US 8,396,105 B2
(45) Date of Patent: Mar. 12, 2013

(54) DATA COMMUNICATION CIRCUIT WITH EQUALIZATION CONTROL

(75) Inventors: Friedel Gerfers, Duisburg (DE); Gerrit Willem Den Besten, Eindhoven (NL); Pavel Petkov, Starnberg (DE); Andreas Koellmann, Rosengarten (DE); Jim E. Conder, Wielenbach (DE)

(73) Assignee: NXP B.V., Eindhoven (NL)

( * ) Notice: Subject to any disclaimer, the term of this patent is extended or adjusted under 35 U.S.C. 154(b) by 755 days.

(21) Appl. No.: 12/067,068

(22) PCT Filed: Sep. 12, 2006

(86) PCT No.: PCT/IB2006/053236
§ 371 (c)(1),
(2), (4) Date: Dec. 11, 2008

(87) PCT Pub. No.: WO2007/034366
PCT Pub. Date: Mar. 29, 2007

(65) Prior Publication Data
US 2009/0219983 A1 Sep. 3, 2009

(30) Foreign Application Priority Data
Sep. 19, 2005 (EP) .................................. 05108623

(51) Int. Cl.
*H03H 7/30* (2006.01)
(52) U.S. Cl. .................... 375/232; 375/316; 375/371
(58) Field of Classification Search .......... 375/229–236, 375/355, 316, 371
See application file for complete search history.

(56) References Cited

U.S. PATENT DOCUMENTS

| | | | |
|---|---|---|---|
| 5,481,565 A * | 1/1996 | Pal | 375/232 |
| 5,991,339 A * | 11/1999 | Bazes et al. | 375/232 |
| 6,731,697 B1 | 5/2004 | Boccuzzi et al. | |
| 6,819,166 B1 * | 11/2004 | Choi et al. | 327/551 |
| 7,406,122 B2 | 7/2008 | Shimobayashi et al. | |
| 7,433,440 B2 | 10/2008 | Noguchi et al. | |
| 2004/0005001 A1 * | 1/2004 | Jones et al. | 375/232 |
| 2005/0025228 A1 * | 2/2005 | Stonick et al. | 375/232 |
| 2005/0117489 A1 * | 6/2005 | Serizawa | 369/59.21 |
| 2006/0291551 A1 * | 12/2006 | Goth | 375/232 |

FOREIGN PATENT DOCUMENTS

| | | |
|---|---|---|
| CN | 1 627 739 A | 6/2005 |
| EP | 1453238 A1 | 9/2004 |
| JP | 61-242125 A | 10/1986 |
| JP | 2003-258924 A | 9/2003 |

OTHER PUBLICATIONS

Everitt, James; et al "A CMOS Transceiver for 10-MB/S and 100 MB/S Ethernet" IEEE Journal of Solid-State Circuits, vol. 33, No. 12, Dec. 1998, pp. 2169-2177.

Liu, J; et al "Equalization in High-Speed Communication Systems" IEEE Circuits and Systems Magazine, Second Quarter 2004, pp. 4-17.

* cited by examiner

Primary Examiner — Shuwang Liu
Assistant Examiner — David Huang

(57) ABSTRACT

An adaptive equalizer comprises an adjustable equalizer circuit that allows to enhance the frequency dependence of contents of the transmitted signals which suffer from losses in the connected transmission channel. A blind equalization tuning procedure is proposed that operates without knowledge about the characteristic of transmission channel. Phase positions of transitions in the equalized signal are detected. A digital post-processing circuit evaluates a measure for spread of the detected phase positions of transitions, accumulated over a plurality of the symbol periods. The digital post-processing circuit controls the adjustable equalizer, setting the adjustable equalizer to a setting wherein the detected spread is minimized.

14 Claims, 6 Drawing Sheets

DATA COMMUNICATION CIRCUIT WITH EQUALIZATION CONTROL

FIELD OF THE INVENTION

The invention relates to data communication circuits. More particularly, the invention relates to auto-adjustment of channel equalization in order to compensate for the frequency dependent distortion of signals transmitted over the communication channel.

BACKGROUND ART

The need to equalize signals in high speed communication has been described by J. Liu; et al. in an article titled "Equalization in High-Speed Communication Systems", published in the IEEE Circuits and Systems Magazine, pages 4-17, 2004.

Wireline communication systems consist conceptually of three different building blocks: a transmitter (TX), a channel (e.g. a cable or optical fiber) and a receiver (RX). Due to non-ideal channel characteristics like limited bandwidth and crosstalk noise, the RX input signals are deteriorated such that the data recovery on the receiver side ends up with unreasonable bit error rates (BER). Increasing system bandwidth requirements in combination with longer transmission lines makes the above mentioned problem worse.

Usually, of major concern is the limited channel bandwidth, which causes inter-symbol interference (ISI). This is due to the fact that the binary data pattern (e.g. NRZ or RZ pulses) contains many different frequency components that suffer from dispersion after transmission via the channel. A single "0" or "1" after a long data string of ones or zeros respectively, might not reach/exceed the switching threshold.

This means that the data eye is completely closed. Therefore, reliable data recovery is impossible and accordingly the BER is downgraded. Therefore, channel equalization is mandatory in order to restore timing (and amplitude) information which improve the receive signal quality and therewith the BER. Channel equalization can be done on transmitter side using pre-emphasis or on receiver side employing post-equalization. A combination of both techniques features highest performance.

Of major concern is the adaptation or tuning of the equalizer transfer function according to the used cable length and data rate. For many applications this has to be done without any information about transmission channel (length and performance) or transmitted data. In the past, this has been accomplished in several ways:
1. By analyzing the received signal power and adjusting an analog or digital filter according to the required power level, which is e.g. stored in the memory.
2. Analyze the equalized data on short and long term (e.g. by low pass and high pass filtering and succeeding peak detectors) such that an analog "error" signal is generated to tune the equalizer's transfer function.
3. Calculate the mean square error between the recovered data and a (known) training sequence.
4. Or estimate the channel impulse response (by discrete Fourier transform and its inverse) and adjust the coefficients ( ) of the FIR filter and the coefficients (An) of the IIR filter to counteract the channel losses.

Some of these methods are not practicable in some applications e.g. when no equalizer training sequence is intended in the specification. Another technique mentioned above compares the signal power of the incoming data with values stored in a memory. Here, data dependent errors cause equalizer tuning misalignment, since the received power depends also on the transmitted sequence/order of bits. Secondly a ROM/RAM memory is required.

Furthermore, most of the prior art methods require a lot of analog hardware in terms of filters, peak detectors, amplifiers etc. such that these techniques consume a lot of power and silicon area.

Therefore, the present state-of-the-art equalizer tuning algorithms are either restricted to certain applications or they require a significant amount of power and area consuming analog circuitry. The latter is usually also sensitive to PVT (process, supply voltage and temperature). The new technique proposed here, employs merely digital circuitry, requires only small silicon area and is power efficient, compared to competing solutions. Therefore this invention provides a simple and robust solution to adjust autonomous the cable equalizer and if wanted to select simultaneously the best sampling phase.

The proposed blind equalizer tuning algorithm can be applied to oversampled receiver front-ends.

SUMMARY OF THE INVENTION

Among others it is an object to provide for automated adaptation of equalization in a receiver, which does not depend on knowledge about the characteristic of transmit channel nor the transmitted data.

Among others it is an object to provide for automated adaptation of equalization in a communication system, which does not depend on knowledge about the characteristic of transmit channel nor the transmitted data.

According to one aspect a receiver as set forth in claim 1 is provided. This receiver comprises an adjustable equalizer. Phase positions of detected transitions in the equalized signal are detected and a measure of the spread of the detected phase positions is used to control setting of the equalization circuit.

In an embodiment a transition phase detector is used that comprises a sampling circuit for sampling the equalized signal at different phases during a symbol period and a comparator is used to compare pairs of sample values for successive phase positions. This provides for an all digital way of detecting the phase positions of transitions, which reduces power consumption and circuit area compared to (partly) analog solutions.

In a further embodiment the sampling circuit comprises a plurality of samplers, each for a respective one of the phase positions, each operated by respective clock signal with a period equal to the symbol period and a respective phase corresponding to respective ones of the phase positions. In this way no higher frequencies are needed than the symbol frequency. This increases the maximum achievable speed and reduces power consumption.

In embodiment has a plurality of comparator units, such as N exclusive OR gates, (or exclusive NOR) having inputs coupled to samplers for N pairs of adjacent phase positions.

In an embodiment the spread detector is determined from a number phase of positions for which no transitions have been counted. In an embodiment the spread is determined from a sum of squared deviations of the phase positions of the transitions from an average position.

In an embodiment the count of phase positions of transitions is also used to select the phase at which the analog signal will be sampled to derive digital output data.

BRIEF DESCRIPTION OF THE DRAWING

These and other object and advantages of the communication circuit and the receiver will become apparent from a description of exemplary embodiments using the following figures.

DETAILED DESCRIPTION OF THE EXEMPLARY EMBODIMENTS

Figure 1:
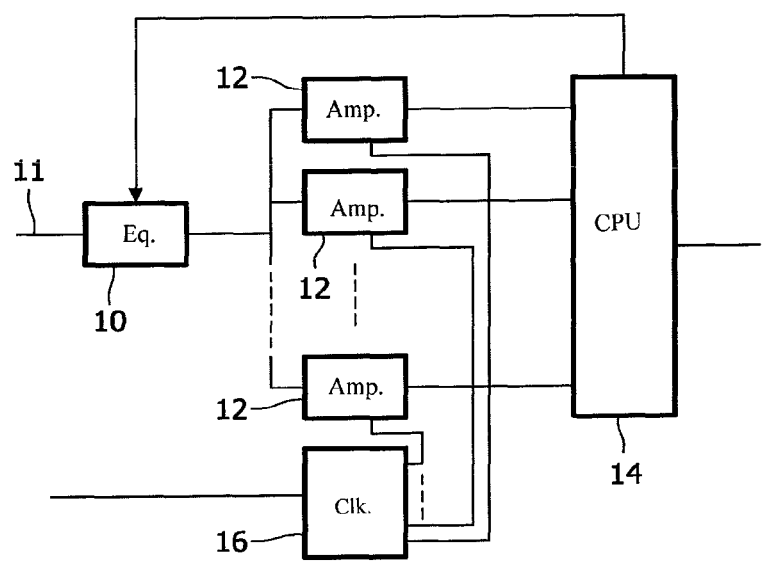
FIG. 1 shows a receiver circuit.

FIG. 1 shows a simplified block diagram of a receiver circuit for synchronous reception. The circuit comprises an adaptable equalizer 10, a plurality of sampling amplifiers or samplers 12, a digital post-processing circuit 14, a clock recovery circuit 16. A circuit input 11 is coupled to a signal input of equalizer 10, which has an output coupled to each of sampling amplifiers 12. Outputs of sampling amplifier 12 are coupled to digital post-processing circuit 14. Digital post-processing circuit 14 has a first output coupled to a signal output 15 of the circuit and a second output coupled to a setting input of equalizer 10. Clock recovery circuit 16 has outputs coupled to sampling amplifiers 12. An input of clock recovery circuit may be coupled to circuit input 11 or to an external clock source, or to a switch for selecting between a circuit input 11 and an external clock source. Instead of clock recovery circuit 16 a clock multiplying circuit may be used.

In operation sampling amplifiers 12 sample output of equalizer 10 at the symbol frequency defined by clock recovery circuit 16, with mutual phase offsets. The symbol frequency corresponds the number symbols (e.g. bits) received per time unit. The symbol frequency is the inverse of the symbol period duration, the symbol periods being successive time intervals in which respective symbols are transmitted. Thus, N sampling amplifiers 12 together define an oversampling ratio (OSR) of N over the symbol frequency. The oversampling ratio can arbitrarily chosen, but has to fulfill the condition N>2. Any number N>2 of phase offsets and sampling amplifiers 12 may be used.

The equalizer 10 can be either an analog or digital filter. In general a equalizer circuit has a frequency dependent amplitude and/or phase transfer characteristic. In a tunable equalizer frequency dependence of this amplitude and/or phase transfer characteristic is adjustable. Different equalizers, with different ranges of characteristics may be used, dependent on the type of application. Such equalizers are known per se. In an embodiment the adjustable equalizer comprises a cascade of two high-pass filters and an all-pass filter. In a further embodiment other high pass, low pass or all pass filters etc may be used preceding the cascade, following it or inserted between different parts of the cascade. In another embodiment the adjustable equalizer comprises a cascade of two band-pass filters and a low-pass filter. The feedback loop from the digital post-processing circuit 14 adjust the filter transfer function of equalizer 10. Ideally the adjustment is exactly the inverse to that of the transmission channel. When equalizer 10 comprises an analog filter, a digital feedback vector/value is provided by the postprocessing circuit 14 that alters the filter's time constants such that the transfer characteristic is tuned. Adjustable (tunable) equalizer circuit for the purpose of undoing the effects of transmission channels are known per se from the prior art. Any such equalizer circuit may be used.

Figure 2:
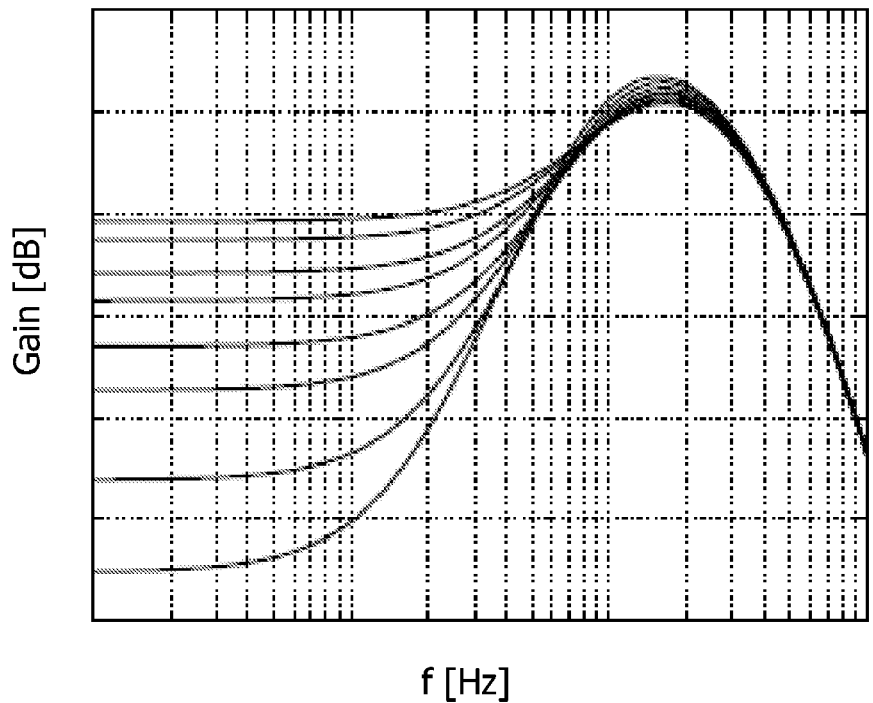
FIG. 2 shows equalizer transfer characteristics.

FIG. 2 shows an example of different equalizer 10 transfer characteristics. In embodiment of a digital equalizer filter, a new set of filter coefficients is provided from post-processing circuit 14. The required number of filters (filter size/stages or filter depth) depends on the one hand on the amount of ISI (Inter Symbol Interference) that should be compensated and on the other hand on the efficiency of a single filter stage.

Sampling amplifiers 12 sense the output of the equalizer at sub-phases of each symbol and amplify the signals in order to obtain digital signal levels. The task of the clock recovery circuit 16, which may comprise a PLL locked to the analog input signal or an external clock signal, is to generate N sampling clocks (phases) each with a period of Tin (the symbol period) and with respective phases, e.g. with successive relative time delays of Tin/N. Thus, output frequency is locked to the input data rate or to an external incoming clock, resulting in an ideal phase step accuracy of TS=Tin/N, with N a positive integer.

The digital post-processing circuit 14 performs the actual data analysis according to the proposed algorithms. Therefore, the digital unit forms a tuning loop with the equalization block, such that the overall transfer (channel and equalizer) characteristic is optimized based on the obtained analysis results. Besides equalizer tuning, the digital post-processing circuit 14 allows to select the optimal sampling phase based on the proposed algorithm. The digital postprocessing circuit 14 may be implemented partly or wholly as a programmed data processing circuit for example, or as a dedicated hardware circuit.

Figure 3:
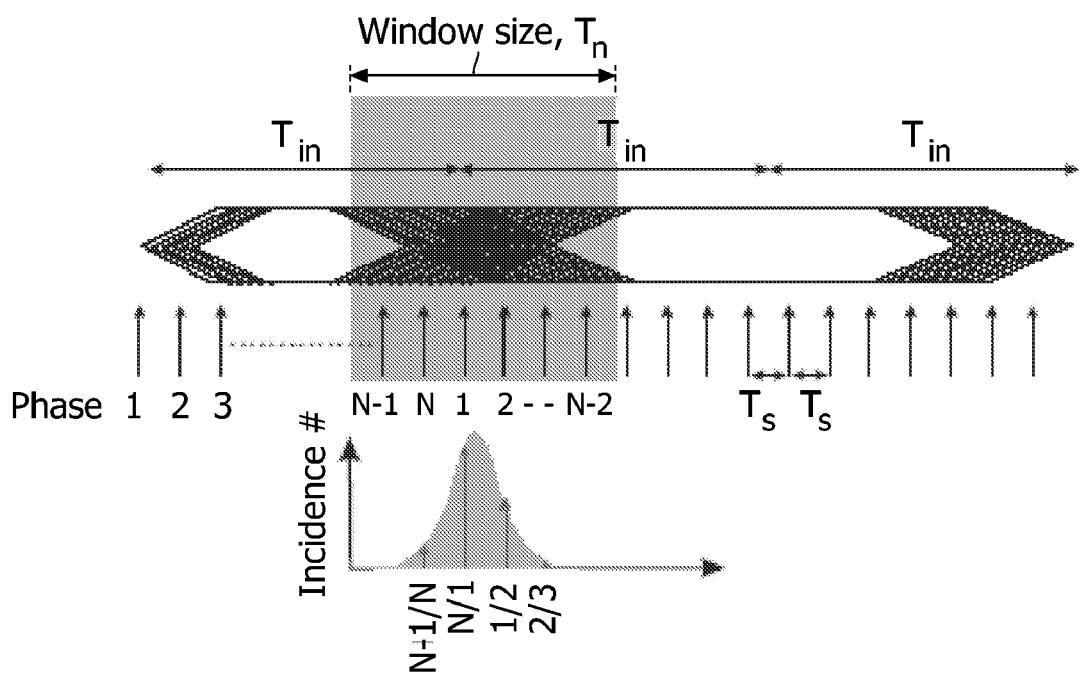
FIG. 3 illustrates sampling time points and a histogram of transitions.

FIG. 3 illustrates the sampling time points of sampling amplifiers 12. The incoming data bits with a bit period of Tin are oversampled with N sampling phases. Thus, the phase accuracy is given by TS. In the following it is assumed, that the sample clock is synchronous to the incoming data. Thus, the data bits ideally featuring a period of Tin are N times oversampled as shown. The samples are tracked for signal transitions. Obviously, transitions occur between two consecutive sampling phases e.g. phases 1/2, 2/3, ..., N−1/N. If as count of transitions for each sub-phase is accumulated for a certain time or number of bits, a histogram can be drawn.

FIG. 3 also illustrates the histogram. The x-axis of the histogram shows consecutive phases and the y-axis shows the number of transitions that has occurred for consecutive sampling phases, e.g. phase pair N−1/N means the number of transitions that has taken place between sample phase N−1 and N.

The proposed equalizer tuning algorithm and phase selection procedure is based on the effect of channel filtering on the histogram distribution. It is found that the histogram becomes worse both (i.e. transitions are concentrated less at or around one phase pair) for under- and overcompensated channels. Therefore, if the histogram is analyzed for different equalizer settings the best setting can be selected using a proper selection algorithm. The best setting minimizes spread of the positions of the transitions and, equivalently, maximizes eye-opening, that is, the range of phase pairs for which no transitions are counted.

Figure 4:
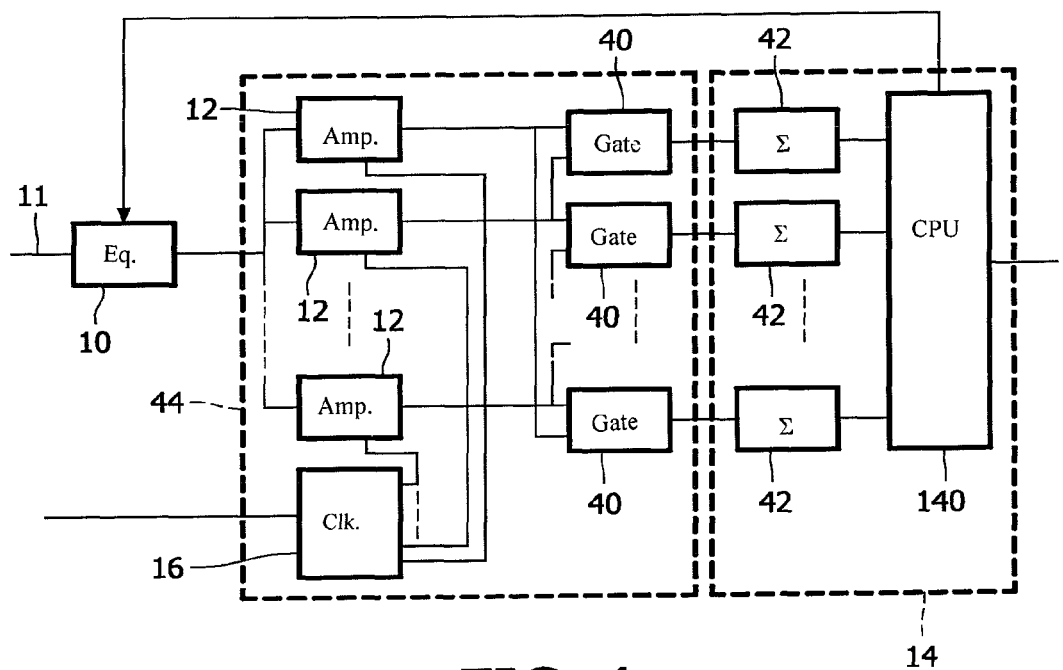
FIG. 4 shows a data-bit transitions detector circuit.

FIG. 4 shows a circuit for detecting data-bit transitions. When sampling amplifiers 12 have digital outputs, the data bit transitions can simply be detected in the digital domain using e.g. N XOR gates 40 and adder/accumulators 42 (or counters) when the digital outputs of the sampling amplifiers are binary outputs. The number of hits (which corresponds to a count of transitions between two consecutive sampling phases) is accumulated for a certain time Tacc or a certain number of transitions Xacc. This can be accomplished by using N adders 42 with k-bit depth (k=log 2(Tacc/TS) or k=log 2(Xacc)). The N adders correspond to the bins of the histogram with a bin distance equal of TS. The adders may be part of the postprocessing circuit 14, together with a processor 140 that processes the counts.

The sampling amplifiers 12, clock recovery circuit 16 and N XOR gates 40 form a transition phase detector 44, which signals the phase positions of detected transitions. It should be appreciated that such a transition phase detector can be implemented in different ways. For example a single high speed sense amplifier may be used to detect signal levels for all phase positions, successive pairs of output signals being used to detect transitions at different positions. In this example clock recovery circuit 16 need only produce a single high speed oversampling clock. Alternatively a plurality of sampling circuits may be used each for a plurality of the phases. Other phase detectors that are known per se may also be used. However, the use of a plurality of sampling amplifiers, each for a respective phase, has the advantage that a maximum symbol frequency can be used, which is not limited by the need to use a clock with an oversampled frequency. Also, power dissipation is reduced by the use of a lower clock frequency.

Although a synchronous solution has been shown by way of example (sampling being controlled in synchronism with the symbol period) it should be appreciated that alternatively asynchronous transition detection may be used. In this case the accumulator to which a detected transition is added may be selected after detection of the transition, dependent on a measured phase of the transition relative to the symbol period. Such asynchronous transitions may be detected using a time continuous transition detector or a clocked sampling detector clocked with a clock that is asynchronous to the symbol periods. Instead of an exclusive NOR, other logic circuits may be used to detect transitions. For example the detected signal levels may be stored for each sampling point and a programmed processor may be used to determine the locations of transitions.

Preferably, the sampling amplifiers convert the analog input signal into time discrete binary signals, assuming a logic one or zero when the analog input signal is above or below a threshold level respectively for example. The threshold may be predetermined or depend on previously detected bit values as part of an inter-symbol interference reduction scheme. Adder/accumulators 42, which act as counters of the number of detected transitions at different phase positions, cooperate with part of post-processing circuit 14 to form a spread detector.

Figure 5:
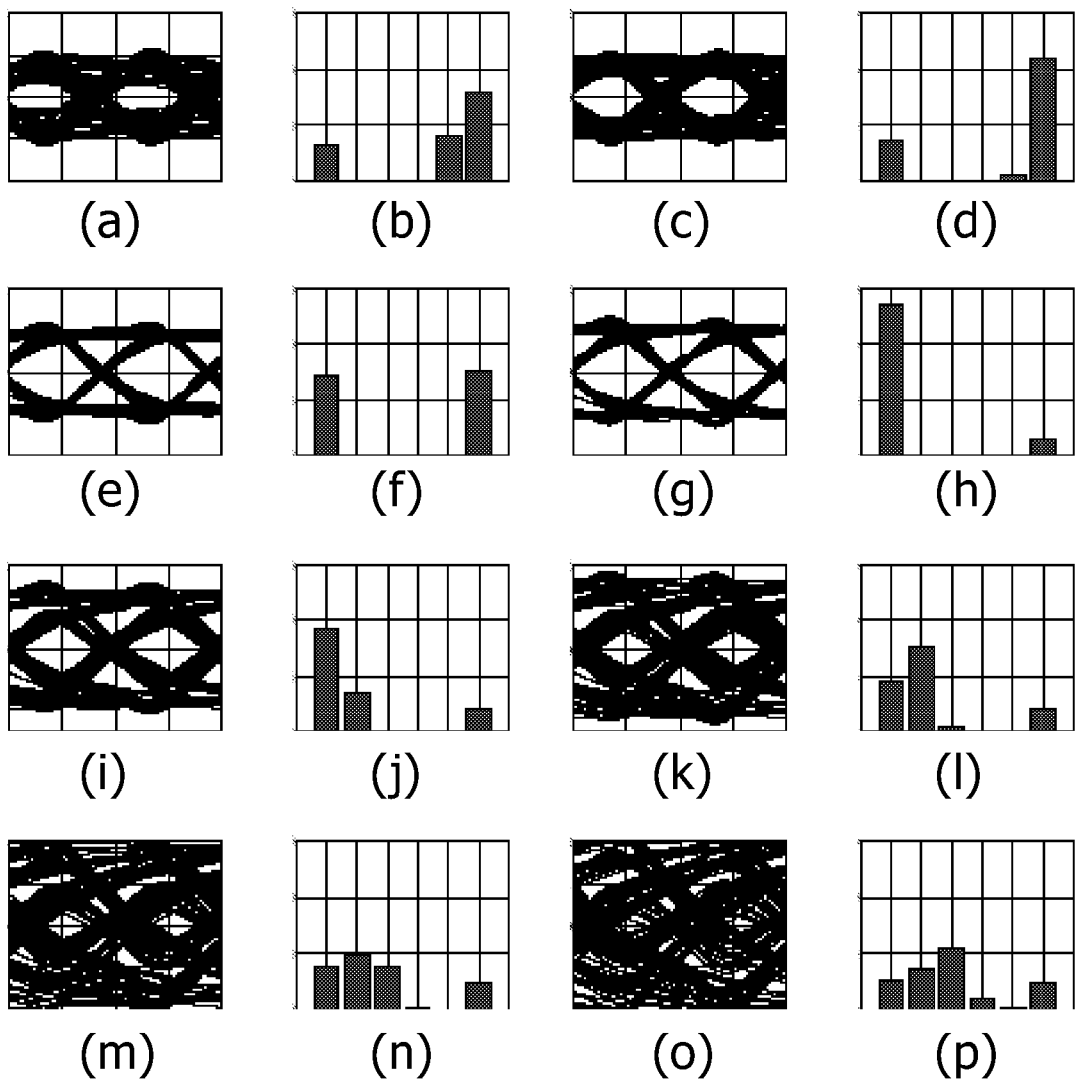
FIGS. 5a-p show processing results.

FIG. 5*a-p* show results obtained with this circuit. Typical eye diagrams and histograms (sample phase counts) are shown after transmission via a long cable and after the equalization with different equalizer gains. The presented results utilize a 6 times OSR receiver. Here N=6 sampling phases are considered. The figure shows results when the equalizer transfer function as shown in FIG. 2 is modified from one extreme setting (FIGS. 5*a* and 5*b*) to the other extreme setting (FIGS. 5*o* and 5*p*), in this specific embodiment the low frequency gain being the parameter to change. The resulting (typical) eye diagrams and corresponding histograms after transmission via the channel (for example a long UTP cable) and after equalization are illustrated in detail.

The eye opening and histogram (and therefore the BER) alters with equalizer settings. As a result, the histogram is a suitable measure for the data eye quality and accordingly for the adjustment of the equalizer.

Data and Histogram Analysis

The histogram data can be analyzed according to the methods presented below in order to select the best settings. Further accuracy improvements can be achieved by averaging techniques. Obviously, the quality of the received data is strongly affected by amount of ISI introduced by the transmit channel which itself is again influenced by the used coding scheme and the ratio between the maximum and following minimum run-length (the number of consecutive equal bits) and the running digital sum. Several histogram analysis criteria are possible in order to identify the best equalizer settings. Two criteria are described below. Both can be separately applied, however the highest tuning accuracy is obtained if both are combined.

Figure 6:
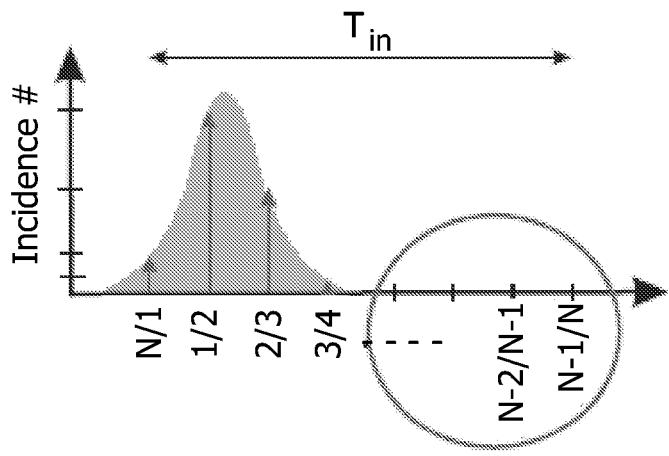
FIG. 6 illustrates an eye-opening criterion.

FIG. 6 illustrates a first criterion that optimizes the eye-opening, which means the number of sample periods in which no transitions occur. In FIG. 6 N samples are placed within the data bit period of Tin. It is obvious from this example that between four sampling periods (namely between sampling period N/1, 1/2, 2/3 and 3/4) transitions occur. All other pairs of sampling phases are free from data transitions. Thus, the value for the eye opening yields N−4. In general, the maximum possible eye opening is given by N−1 if all transition take place between two sampling phases. Another important issue is that the absolute position of the histogram within the samples is not of interest, which simplifies the calculation.

But especially, if high tuning accuracy is demanded, this single eye opening parameter is not sufficient. Another criterion is to optimize the standard deviation of the histogram data. This is a more sensitive measure to determine the optimum situation. The histogram analysis yields the mean value and the standard deviation from the obtained data eye within the transition region. The eye opening and the characterization of the histogram takes place by means of the standard deviation and the mean value $\mu$, which is done completely in the digital domain. The calculation accuracy (sample resolution (TS/N) or even sub-sample accuracy<TS/N, see below) depend on the selected algorithm and corresponding hardware complexity. The standard deviation can be determined in several ways resulting in different precisions and required hardware complexity. Thus, a design trade-off between accuracy and hardware effort arises.

The analysis can be done by means of calculating the exact mean value and standard deviation of the obtained histogram. This method shows the most accurate result (sub sample accuracy) but demands at the same time the highest hardware effort. The mean value is given by the sum of the products of successive indices of bins in the histogram times the number of hits in the bin, divided by the total number of hits. The square of the standard deviation sigma is given by a weighted calculation which multiplies the bin value with the squared difference of the actual bin from its mean value. The simplest (straight forward) estimation defines the maximum bin as the mean value of the histogram and calculates the standard deviation by applying a quadratically binary weighted calculation. This method requires obviously much less hardware since, is directly given and the distances that determine the weights are integer values. The square of the weight can be approximated by the closest one-hot binary value to further simplify data processing. However this method has limited accuracy; approximately equivalent to one sampling phase precision). This method assumes that there is a well-defined peak with more or less symmetrical tails on each side.

A compromise approach with better accuracy and very limited hardware cost is to assume an average value either close to the center of a bin or exactly at the edge between two bins. This reduces the maximum error significantly compared to assuming the peak bin as average but is of course less accurate then the exact calculation (explained above). As the accuracy is below a sample period, this has a little impact on the performance compare to the full-fledged calculations of the first method. If the multiplier distance coefficients for the calculations are rounded to one-hot binary values, multiplication operation can be realized with shifts which further reduces hardware complexity. It has been found that the multiplication with different square distances can be approximated by shifting. In general multiplication can be performed by shifting an adding, for each distance to the average phase position a predetermined number of versions of a count of transitions for that distance, each shifted by a predetermined amount. However, a good approximation can be realized without adding.

The criterion for selecting the mean value as peak bin or just in the middle between the highest two bins must be such that the smallest possible error is made. This means that it is preferable to select the peak bin if the average is closer to that peak bin than TS/4, and it is preferable to select the middle value if the average is further away than TS/4 (which means it is closer to the middle point than TS/4). The most accurate way to do that is to calculate and select the best of the two options. The calculation of itself can be simplified as well at the cost of accuracy. If it can be assumed that the histogram only contains 3 bins with a significant number of detected transitions (which occurs for small oversampling ratios (e.g. when N=5-10), then the above-mentioned criterion can be approximated by easy evaluable criteria like Xmax-side>4*Xmin-side and Xmax-side>Xpeak/2 where Xpeak is the value of the peak bin and Xmax-side and Xmin-side are the values of neighbor bins around the peak bin. However in that case the advantage over the simple peak selection is limited due to the increased inaccuracy. Accurate µ determination with simplified sigma calculation gives the best quality results for a reasonable amount of hardware.

The coefficients sigma for calculating sigma are either $0^2$, $1^2$, $2^2$, $3^2$ for the peak-bin case which can be approximated with 0, 1, 4, 8, multiplications with these numbers can be realized by shifting binary transition count values. For the between-bin case the coefficient $0.5^2$, $1.5^2$, $2.5^2$ can be approximated by 0, 2, 8, multiplications with these numbers can also be realized by shifting binary transition count values. Instead of the peak bin, the eye-opening window can be used to determine the center of the transition period at the opposite phase within a symbol period. Advantage of this method is that it is much less sensitive to the exact shape of the distribution over the bins.

Averaging Techniques

The upper mentioned techniques permit to adjust the equalizer transfer function accurately. But however, it is recommended to use averaging techniques in order to avoid or minimize data dependency of the histogram based tuning algorithm to average-out temporary effects caused by circuit and substrate noise, clock jitter, supply voltage fluctuations, offset in the sampling units etc. Two averaging methods can be used. The simplest approach is to repeat the histogram based tuning algorithm several times (multiple measurements). The obtained values (eye opening and sigma) are again stored, such that the best equalizer vector/setting with maximum number of hits is chosen.

Figure 7:
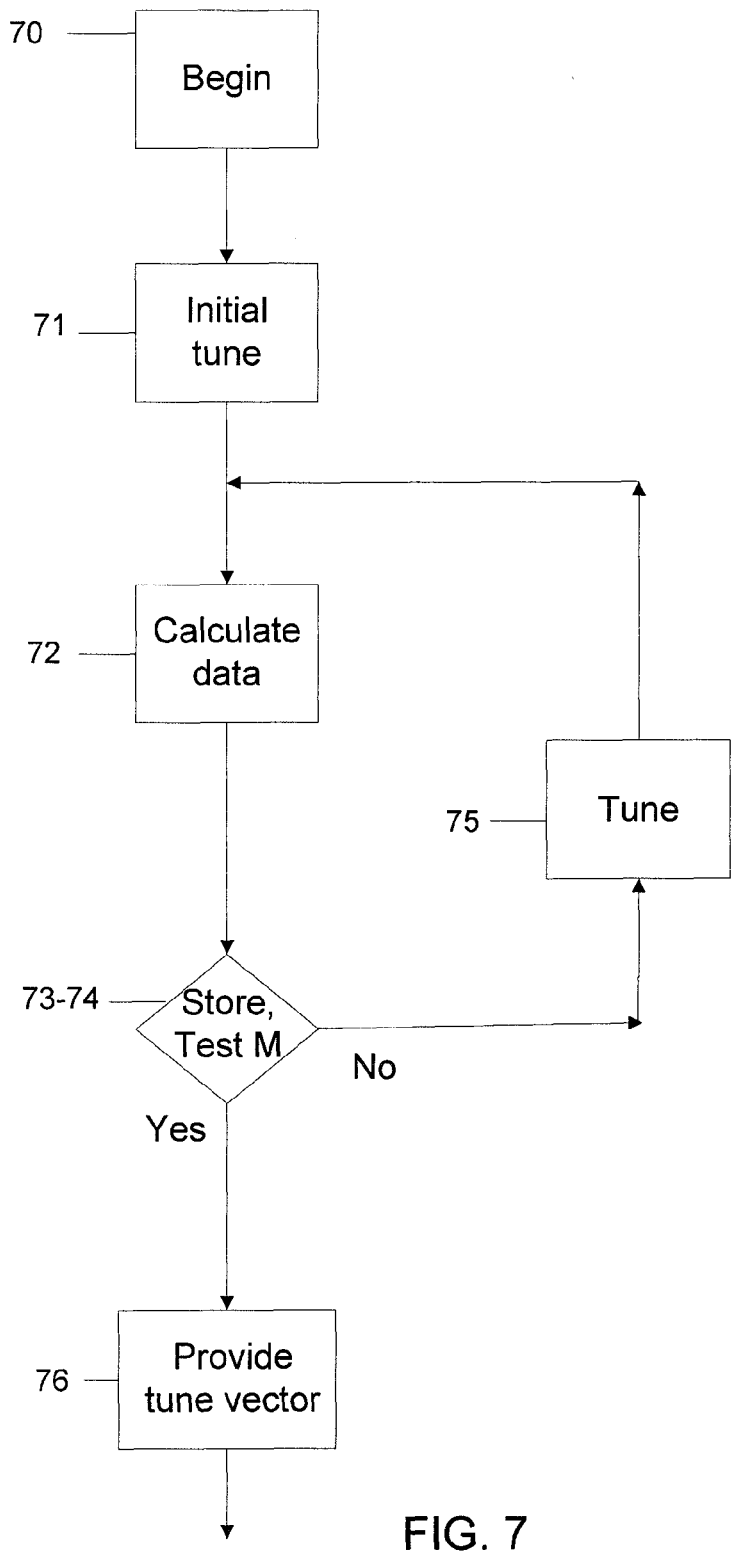
FIG. 7 shows a calibration flowchart.

FIG. 7 shows a flowchart for calibration. In a first step 71, a first vector is provided to tune/initialize the equalizer. In a second step 72, the quality of the incoming data is calculated according to the data eye and histogram analysis for a certain number of bits or data transitions. In a third step 73 values of eye opening and standard deviation are stored. In a fourth step 74, it is tested whether the analysis has been repeated a predetermined number (M) times. If not, a fifth step 75 alters the equalizer tuning vector and the method is repeated from second step 72. Once the analysis has been repeated M times, a sixth step 76 is executed, wherein the tuning vector that provides the optimal effect according to the data eye and histogram analysis is provided to equalizer 10. In instead of evaluation of different spread values an iterative process may be used to select the setting of the equalizer, for example in a feedback loop, selecting settings of the equalizer that successively reduce spread at least until a minimum spread is reached.

Figure 8:
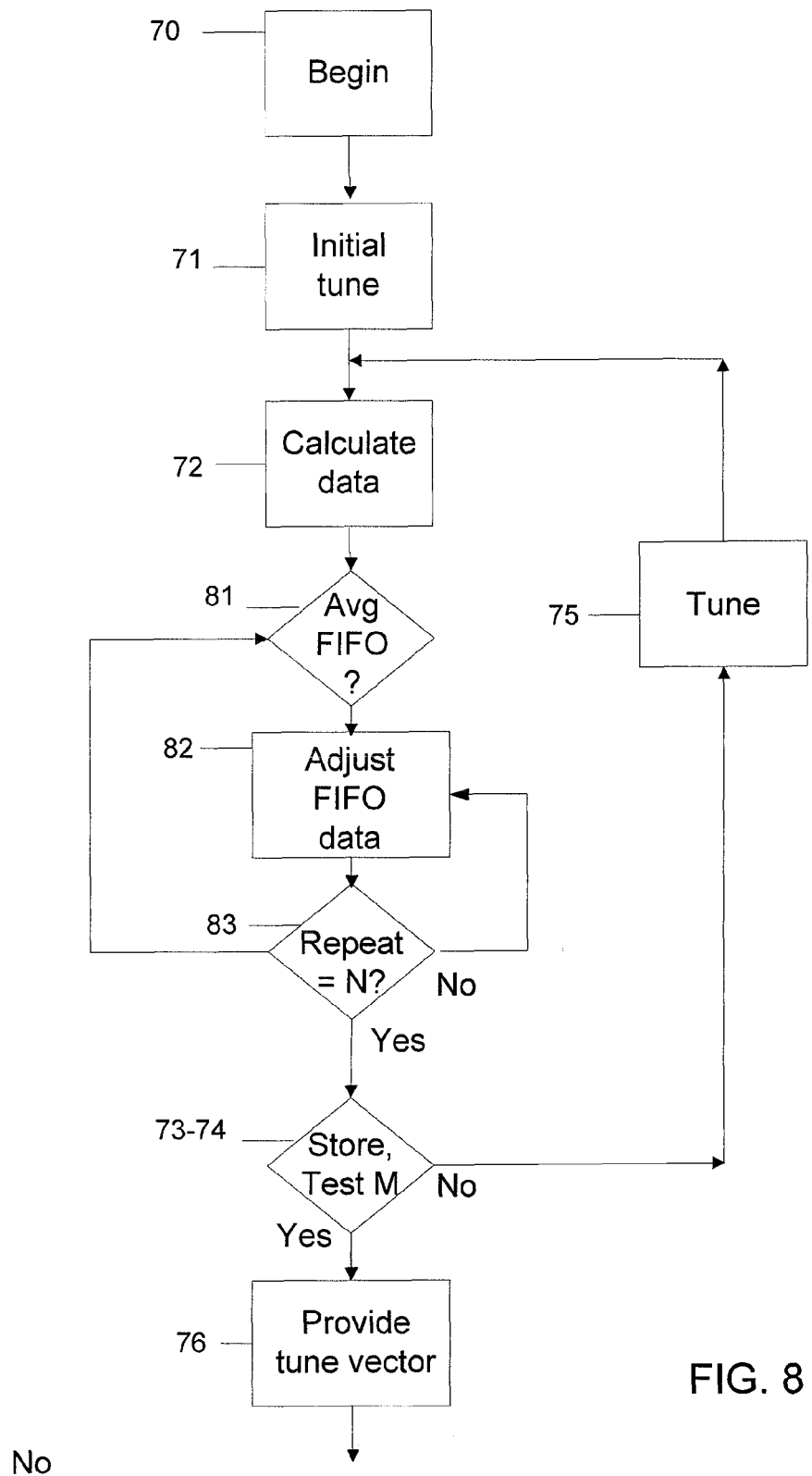
FIG. 8 shows an alternative calibration flow chart.

FIG. 8 shows a flow chart of a more sophisticated approach that uses a FIFO like method (long term average). Here, a new data transition (data bit) is taken into account (into one of the three upper mentioned histogram calculation) and removes the oldest data bit from measurements. After second step 72, optionally a first additional step 81 is inserted to decide whether FIFO averaging is to be used. If so a second additional step 82 is executed to put a new data bit or a data transition into account (i.e. put it in the FIFO buffer for bits) and remove the oldest value from the data eye and histogram analysis. This may be repeated a number of times under control of a third additional step 83. Subsequently the process continues from third step 73.

Optimal Sampling Phase Selection

As visible from the histogram, if the equalizer is optimally adjusted there is a maximum number of bins without transitions and/or the sigma is minimized. It is evident that the eye-opening is optimal in that case. Due to the fact, that also the mean value of the data transition point is estimated in some way by all versions of the algorithm, it is possible to select the best sampling phase. The optimal sampling phase is exactly 180 degrees away from the histogram "mean value" or maximum bin of the histogram, depending on which criterium is used. In other words the best estimation for the center of the eye.

This, situation is visible in FIGS. 5c and 5d. Here the maximum bin corresponds to sampling phase 5, while 180 degrees away (sampling phase 2) represent obviously the best sampling phase. Depending on the mean value of the histogram the optimal sampling phase can be located between 2 phases. This case is similar to that shown in FIGS. 5(e) and (f). Here the histogram mean value yields −0.53 (which corresponds to a 360 degree phase shift to phase 5.47). Accordingly, the optimal phase lies between 2 and 3 (exact optimal sampling phase is 2.47). So that phase 2 is the optimal selection.

Calibration

The upper mentioned tuning algorithm can be used in different modes, depending on the application and the requirements. The simplest equalizer tuning approach is based on a system-start-up calibration procedure, such that at each power up and data rate change (indicated by the CRC in one embodiment), a re-calibration is performed (which is mandatory, since the channel losses are significantly frequency dependant).

Besides, the eye opening and histogram analysis parameter can also be monitored still in normal operation, so that parameter variations can be detected and at a certain point (certain parameter difference) a new calibration cycle is initiated. A more sophisticated calibration is possible, if the transmitter and receiver have additional features, like: 1. a certain known training sequence (e.g. at start-up), such that the equalizer tuning algorithm can be optimized for the known data content 2. some way to have backward communication from the receiver to the transmitter, which enables any kind of closed loop calibration cycle.

Figure 9:
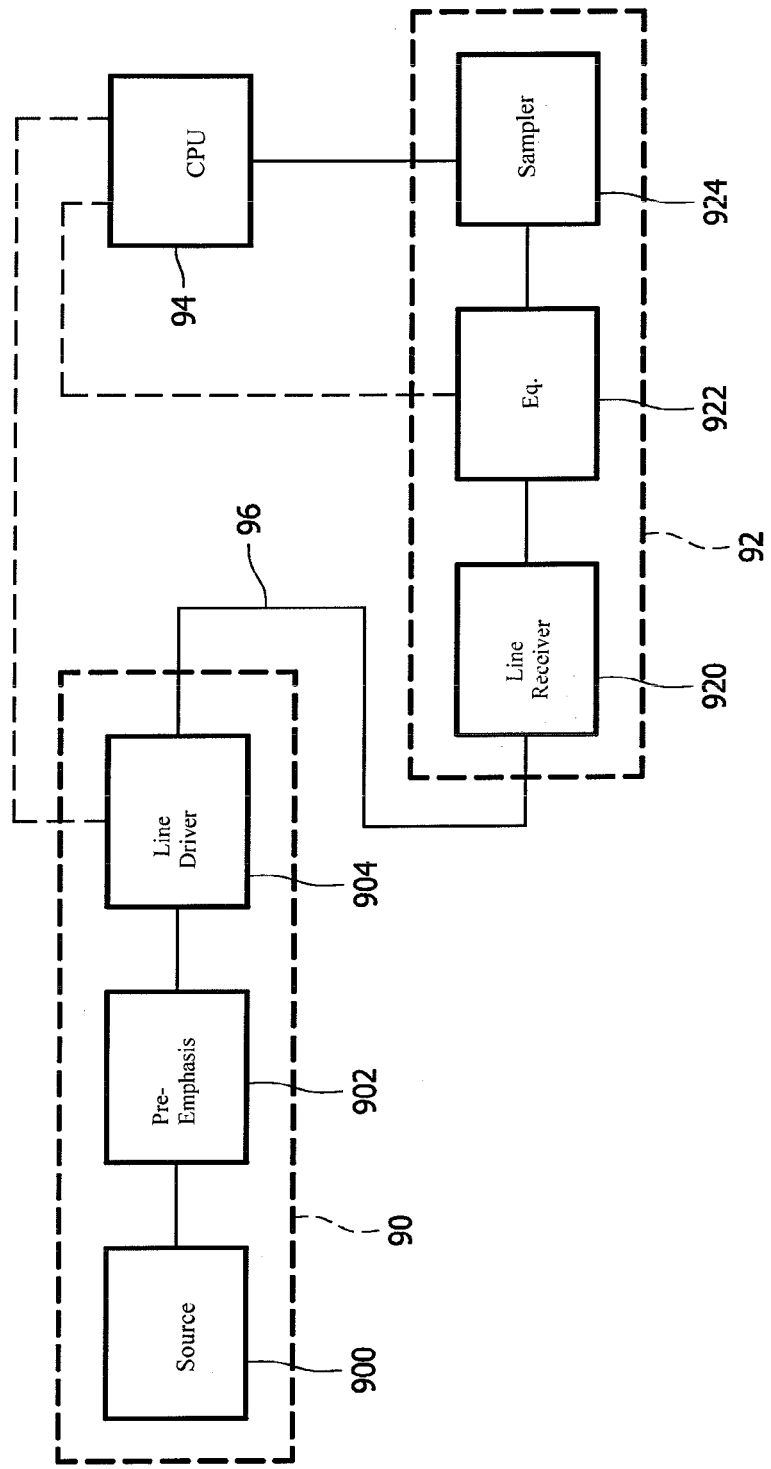
FIG. 9 shows a communication system.

FIG. 9 shows a communication system with a transmitter 90, a receiver 92, a post-processing circuit 94 and a communication line 96 coupled between transmitter 90 and receiver

92. Transmitter 90 comprises a signal source 900 a pre-emphasis circuit 902 and a line driving circuit 904. Signal source 900 is coupled to communication line 96 via pre-emphasis circuit 902 and line driving circuit 904. When an electrical conductor or conductors are used for communication line 96, line driver 904 may be an electrical driver circuit. When an optical line is used for communication line 96, line driver 904 may be an optical modulator circuit for example. As used herein communication line 96 can also be a wireless communication channel, in which case line driver 904 may be a modulator and transmitter circuit for wireless signals. Receiver 92 comprises a line receiver 920 with an input coupled to communication line 96, an equalizer 922 and a sampling circuit 924 in cascade. Receiver 92 may comprise a buffer circuit in the case of an electrical conductor, an optical signal detector in the case of an optical fiber communication line or a wireless receiver in the case when a wireless channel is used for the communication line. Post-processing circuit 94 is coupled to sampling circuit 924. Typically, post-processing circuit 94 is part of receiver, but post-processing circuit 94 may also be part of transmitter 90, when backward communication from receiver 92 to transmitter 90 is provided. Post-processing circuit 94 may also be a separate unit.

Communication from post-processing circuit 94 back to equalizer 922 and/or pre-emphasis circuit 902 is shown by dashed lines. Backward communication from receiver 92 to transmitter 90 may be provided for example by communication via communication line 96, or via another channel. Backward communication from receiver 92 to transmitter 90 may be used to adjust the setting of pre-emphasis circuit 902 so as to maximize eye-opening. Backward communication to adjust the setting of equalizing circuit 922 so as to maximize eye-opening.

In summary, an embodiment of the proposed equalizer tuning algorithm uses merely digital circuitry to obtain the parameters that adjust the equalizer transfer function. Thus, this approach is highly power efficient, less bulky than prior art techniques and robust. An adaptive equalizer is used that comprises one or multiple tuning circuits, that allows to enhance the high-frequency contents of the transmitted signals which suffer from losses in the connected transmission channel. Alternatively, a partly an analog circuit may be used, using for example an analog transition detector and optionally an analog spread detector. However, when high power efficiency is needed the digital embodiment provides considerable advantages.

In an embodiment the proposed blind equalization tuning procedure operates without knowledge about the characteristic of transmit channel nor the transmitted data. In an embodiment it is fully implemented in the digital domain, so that it requires no additional power and area hungry analog circuitry. The only restriction of this algorithm is, that an oversampling receiver architecture is required. Because the proposed equalizer tuning and phase picking algorithm does not demand a certain specific training sequence or coding scheme, it is not restricted to such applications. The proposed technique is a power and silicon area efficient way to perform adaptive channel equalization. In an embodiment a low-cost 2 Gb/s receiver solution works for low-quality twisted pair cables up to 20 m. A receiver is provided for receiving an analog input signal and recovering a digitized, time discrete data signal comprising an adjustable equalizer, a sampling phase generator for generating a plurality phase signals, a plurality of samplers, and a digital post-processing block arranged to adjust the settings of the tunable equalizer. The samplers operate at the data clock frequency of the time discrete data signal under control of the respective phase signals. The output signals of the respective samplers represent an estimate of the time discrete data signal at each of the phases defined by the respective phase signals. The digital signal processing block is arranged to optimize the settings of the adjustable equalizer based on the output signals of the samplers over a plurality of data clock periods. In an embodiment the receiver further comprises a clock recovery circuit for recovering the data clock frequency of the time discrete data signal out of the received analog input signal. In another embodiment the adjustable equalizer comprises a cascade of two high-pass filters and an all-pass filter. In yet another embodiment the adjustable equalizer comprises a cascade of two band-pass filters and a low-pass filter. The receiver may be used in a data communication system. In an embodiment the data communication system may be a DVI or HDMI compliant communication system.

The invention claimed is:

1. A receiver for receiving an analog input signal and recovering digitized, time discrete data signals for respective symbol periods of the analog input signal, the receiver comprising:
   an input for the analog signal;
   an adjustable equalizer, with an equalizer input coupled to the input for the analog signal, an equalizer output for an equalized signal and a setting input;
   a transition phase detector with an input coupled to the equalizer output, for detection of phase positions of transitions in the equalized signal;
   a digital post-processing circuit, comprising a spread detector with an input for receiving output of the transition phase detector, for evaluating a measure for spread of the detected phase positions of transitions accumulated over a plurality of the symbol periods, the digital post-processing circuit having an output coupled to the setting input of the adjustable equalizer, for adjusting a setting of the adjustable equalizer to a setting selected to minimize the detected spread;
   wherein the transition phase detector comprises:
   a clock generation circuit for generating or regenerating clock signals that indicate a plurality of respective phase positions in each symbol period;
   a sampling circuit with a timing control input coupled to the clock generation circuit, a signal input coupled to the equalizer output and a sample output; and
   a comparator circuit with input coupled to the sampling circuit for receiving pairs of sample values for successive phase positions and a comparator output coupled to the input of the spread detector.

2. A receiver according to claim 1, wherein the sampling circuit comprises a plurality of samplers, each for a respective one of the phase positions, the clock generation circuit having a plurality of phase outputs, coupled to respective ones of the samplers, each phase output for supplying a respective clock signal with a period equal to the symbol period and a respective phase corresponding to respective ones of the phase positions.

3. A receiver according to claim 2, wherein the comparator circuit comprises a plurality of comparator units, each having inputs coupled to a pair of samplers for a respective pair of adjacent phase positions.

4. A receiver according to claim 1, wherein the adjustable equalizer comprises a cascade of two high-pass filters and an all-pass filter.

5. A receiver according to claim 1, wherein the adjustable equalizer comprises a cascade of two band-pass filters and a low-pass filter.

6. A receiver according to claim 1, wherein the spread detector is configured to count transitions for respective ones of the phase positions and to determine a number phase of positions for which no transitions have been counted.

7. A receiver according to claim 1, wherein the spread detector is configured to determine an average phase position of the transitions and an indication of a sum of squared deviations between the average phase position and the phase positions of the transitions, and to derive said measure for the spread from said indication of the sum of the squared deviations.

8. A receiver according to claim 7, wherein the spread detector is configured to set the average phase position to a phase position with a maximum count of accumulated transitions and/or a phase position midway between phase positions with higher count of accumulated transitions than other phase positions.

9. A receiver according to claim 7, wherein the spread detector is configured to assign weights to respective ones of said phase points dependent their distance to the average phase transition, the weight being at least approximately proportional to a squared distance from the average phase transition, and to compute the sum of squared deviations by summing counts of transitions for respective phase points weighted by said weights.

10. A receiver according to claim 9, wherein the spread detector is configured to select the weights from predetermined weight values.

11. A receiver according to claim 9, comprising shift circuits configured to perform weighting by shifting over a number of bits corresponding with the weight values.

12. A receiver according to claim 1, wherein the post-processing circuit is configured to set a data signal sampling phase half a symbol period out of phase with a phase position of average and/or maximum accumulated transitions.

13. A receiver according to claim 1, wherein receiver is a wireless signal receiver, configured to generate the analog signal by wireless reception.

14. A method of setting equalization and/or pre-emphasis for detection of digitized, time discrete data signals for respective symbol periods, the method comprising:
adjustably pre-emphasizing and/or equalizing an analog signal before and/or after transmission via a communication line respectively;
detecting phase positions of transitions in an analog signal derived from said communication line after pre-emphasizing and/or equalizing;
evaluating a measure for spread of the detected phase positions of transitions accumulated over a plurality of the symbol periods by a spread detector,
adjusting a setting of the adjustable pre-emphasizing or equalizing circuit to a setting corresponding to a minimum value of the evaluated spread;
wherein detecting phase positions comprises:
generating or regenerating clock signals that indicate a plurality of respective phase positions in each symbol period by a clock generation circuit;
sampling the analog signal derived from said communication line after per-emphasis and/or equalizing by a sampling circuit with a timing control input coupled to the clock generation circuit and outputting the sampled signal; and
comparing pairs of sample values for successive phase positions by a comparator circuit with an input coupled to the sampled signal and a comparator output coupled to an input of the spread detector.

\* \* \* \* \*